United States Patent [19]

Dawson

[11] 4,139,072
[45] Feb. 13, 1979

[54] MOTORCYCLE FORMED OF DETACHABLE FRAME MEMBERS

[76] Inventor: Anthony Dawson, 49 Harrison Rd., Malin Bridge, Sheffield S6 4NA, England

[21] Appl. No.: 840,098

[22] Filed: Oct. 6, 1977

Related U.S. Application Data

[63] Continuation-in-part of Ser. No. 633,003, Nov. 18, 1975, abandoned.

[30] Foreign Application Priority Data

Nov. 21, 1974 [GB] United Kingdom ............... 50595/74

[51] Int. Cl.$^2$ ............................................... B60K 5/12
[52] U.S. Cl. .................................... 180/33 A; 180/32; 280/281 R; 280/279
[58] Field of Search ............................. 180/32, 33 A; 280/281 R, 283, 284

[56] References Cited

U.S. PATENT DOCUMENTS

| 2,280,801 | 4/1942 | Dempsey | 280/284 |
| 3,542,146 | 11/1970 | Hooper | 180/33 A |
| 3,722,612 | 3/1973 | Issigonis | 180/32 |

FOREIGN PATENT DOCUMENTS

| 522398 | 9/1953 | Belgium | 180/32 |
| 941111 | 3/1956 | Fed. Rep. of Germany | 180/33 A |
| 521037 | 7/1921 | France | 180/33 A |
| 702480 | 4/1931 | France | 280/281 R |
| 246209 | 3/1926 | Italy | 280/281 R |
| 88491 | 9/1919 | Switzerland | 280/281 R |
| 165485 | 7/1921 | United Kingdom | 280/281 R |
| 283737 | 1/1928 | United Kingdom | 280/281 R |
| 402165 | 11/1933 | United Kingdom | 280/281 R |
| 907903 | 10/1962 | United Kingdom | 180/32 |

*Primary Examiner*—John P. Silverstrim
*Attorney, Agent, or Firm*—Lowe, King, Price & Becker

[57] ABSTRACT

A frame for a motorcycle comprises two or more plate-like members removably secured together in spaced relationship. The plate members are maintained in spaced apart relationship by a number of spacers and secured in place by threaded end portions that extend through apertures in the plate-like members and engage the spacers. The major components of the motorcycle, such as the engine, petrol tank and front fork, are secured between the plate members. The entire frame can be disassembled by removing the threaded end portions and spacers, and then separating the plate members.

6 Claims, 5 Drawing Figures

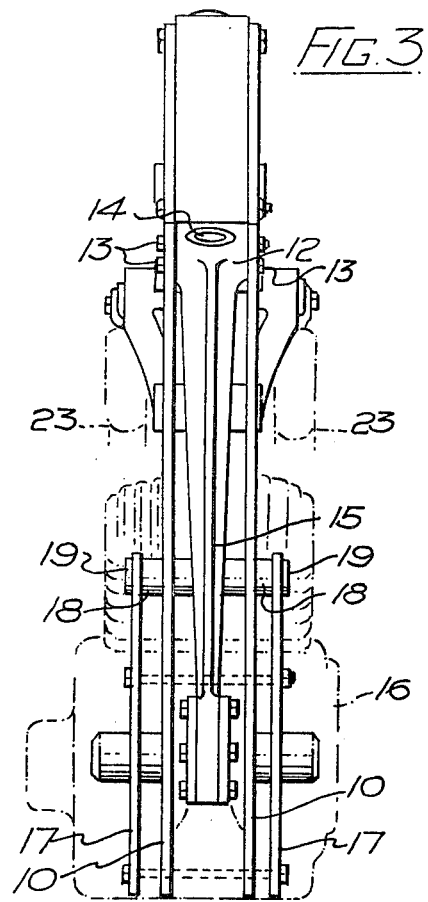
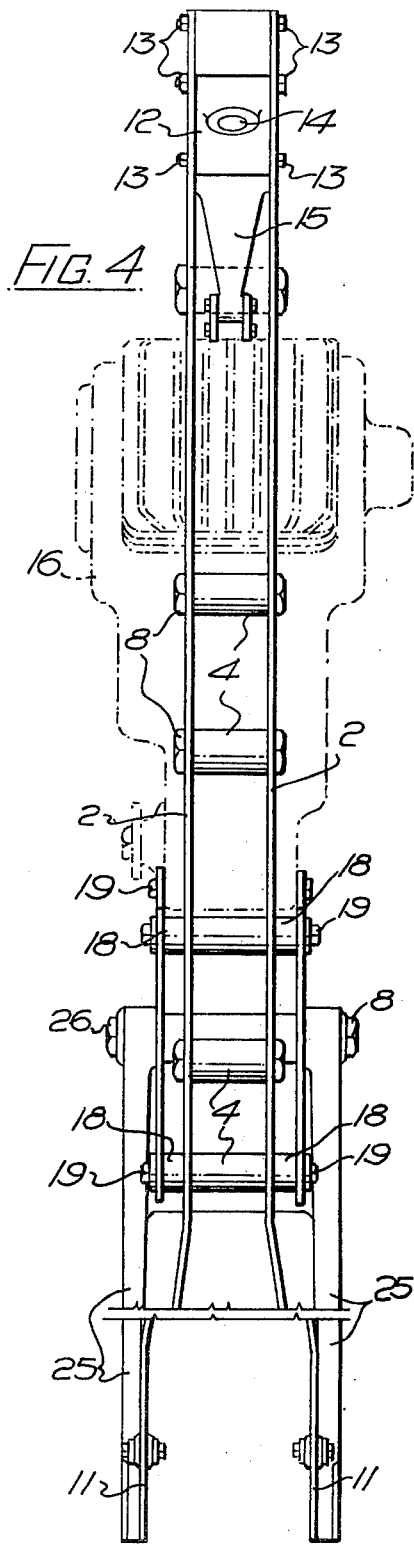
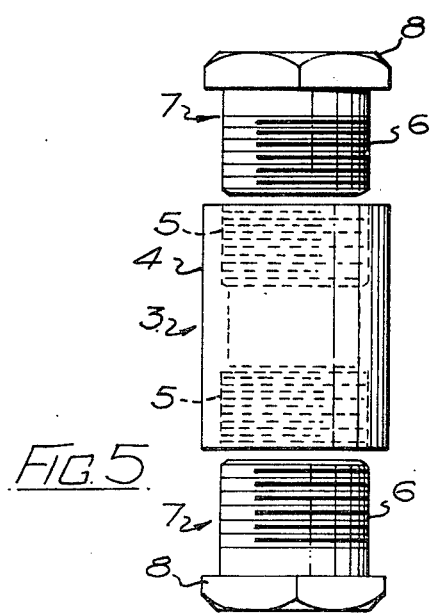

MOTORCYCLE FORMED OF DETACHABLE FRAME MEMBERS

CROSS REFERENCE TO RELATED APPLICATION

This application is a continuation-in-part of my earlier application Ser. No. 633,003, filed Nov. 18, 1975, now abandoned.

BACKGROUND OF THE INVENTION

This invention relates to motorcycles and is particularly concerned with a frame for motorcycles.

Traditionally, a motorcycle frame has been formed from metal tubes, suitably bent and welded together in such a manner as to facilitate the location of the major components of the motorcycle, the front and rear forks, the engine and the petrol tank. The bending and welding of tubes is a task that requires a high degree of skill on the part of the operator and is a time consuming and relatively expensive procedure. Also, the frame must be purposely built for one particular motorcycle, and cannot readily accept engines of different makes, shapes or size, nor can it readily allow alteration of the geometry of front or rear forks. All are important for motorcycles intended for any of the forms of motorcycle sport where ready adjustment or substitution of one major component by another more suited to the particular prevailing conditions would be highly advantageous.

In addition to the above, should a motorcycle be involved in a collision, damage to the frame can easily result in the need to replace the whole frame thus adding considerably to the cost of repair if indeed repair is deemed possible in the light of the cost of replacement frames.

One object of the present invention, therefore, is to provide a frame for a motorcycle of considerably more simplified form than the tubular frames known hitherto, which allows ready replacement of the major components on the frame of the motorcycle, and which allows repair to the frame hitherto not possible.

BRIEF DESCRIPTION OF THE INVENTION

According to the present invention, a frame for a motorcycle comprises two or more relatively wide, plate-like members removably secured together in spaced relationship, there being means on the plate-like members adapted to secure in position the major components of the motorcycle.

By replacing the known tubular construction by two plate-like members removably secured together in spaced and preferably parallel relationship, the task of producing the frame is considerably simplified by substantially reducing the need to effect any bending and eliminating welding steps. The plate-like members themselves can readily be produced of an appropriate shape by any conventional cutting or stamping technique from e.g., high strength, low weight aluminum alloy, or synthetic plastics material and can simply be secured together, e.g., by a number of spacers with threaded ends secured between the plate-like members by tube nuts passing through holes in these plates. It will therefore be readily appreciated that not only is initial construction simplified, but also the repair of any damage to the frame either by straightening of a bent plate or by complete replacement. Preferably, the plate-like members are substantially flat and identical to each other for use, alternatively, as right hand or left hand frame members. The plate-like members may, however, be flared outwardly at the rear portions thereof to accomodate a rear suspension system.

By having two spaced plate-like members, they can be spaced apart by any desired distance to suit the major components of the motorcycle. To allow ready substitution of one engine for the other, it is preferred to provide auxiliary plate members themselves removably secured to the main plate-like frame members, the auxiliary plate members serving as the mounting plates for the engine. The provision of several spacing or distance pieces allows the auxiliary plates to be set at any desired spacing whilst keeping the main plate-like frame members at a constant spacing, whereby one of several different engines can readily be secured to the frame.

It is usual to predetermine the angle of inclination of the front fork and to rigidly secure the fork supporting means to the frame. It is, however, recognized that different angles of inclination are required for optimum performance under different conditions. With a frame constructed in accordance with the invention, the front fork supporting means may be removably secured between the plate-like frame members whereby, in simple manner, one supporting member may be removed and replaced by another to allow adjustment of the angle of inclination of the front forks. Alternatively, the fork supporting member may be adjustably mounted between the frame members whereby the desired angle of inclination of the front fork can be selected from the range provided by the available adjustment. To ensure maximum strength, the front end portions of the frame members holding the front fork supporting member have a width large enough to embrace the supporting member over substantially the entire extent of the length of said supporting member.

At an end of the plate-like frame members opposite the front fork, the rear fork members are pivotally secured, either one to each plate-like frame member or preferably to a pivot pin passing through the plate-like frame members, and any suitable spring or damping arrangement can be provided at a convenient point on the rear fork members and a convenient point on the frame members, at which it may be necessary to bend the frame members to accomodate varied suspension widths.

The petrol tank may be mounted on the frame members in conventional manner, i.e., with a recess in its lower face into which the frame members fit. For some purposes, however, the frame of the invention allows the siting of the tank between the frame members with consequent reduction in width which can be distinctly advantageous, and when a metal or moulded plastic cover may be provided for comfort and appearance.

The invention, as applied to a motorcycle for normal road use, therefore provides a frame which by virtue of its construction from plate-like frame members bolted together allows greatly simplified manufacturing techniques and is therefore eminently suited to mass production utilizing unskilled or semi-skilled labour for the actual assembly of the frame and major components on the frame, with the effect of this on production costs, and greatly facilitates the repair of such motorcycles. For more specialized motorcycles such as for road and track racing, the invention, for the first time, allows the rider to determine, when the conditions are known, factors such as engine type and front fork angular disposition required, and effectively purpose build the motorcycle in these essential respects in a simple manner not possible with conventional frames.

Still other objects, advantages and features of the present invention will become readily apparent to those skilled in this art from the following detailed description, wherein I have shown and described, simply by way of illustration of the best modes contemplated by me of carrying out my invention. As will be realized, the invention is capable of use in other and different embodiments, and its several details are capable of modifications in various, obvious respects, all without departing from the invention. Accordingly, the drawings and description are to be regarded as illustrative in nature, and not as restrictive.

BRIEF DESCRIPTION OF THE DRAWING

One embodiment of the invention will now be described by way of example with reference to the accompanying drawings, in which

FIG. 3 is a front elevation of the frame of FIG. 1;

FIG. 4 is a plan view of a modification of the frame of FIG. 1; and

FIG. 5 is an enlarged view of a spacing or distance piece for use with the frames of FIGS. 1 to 4.

BRIEF DESCRIPTION OF THE PREFERRED EMBODIMENTS

Figure 1:
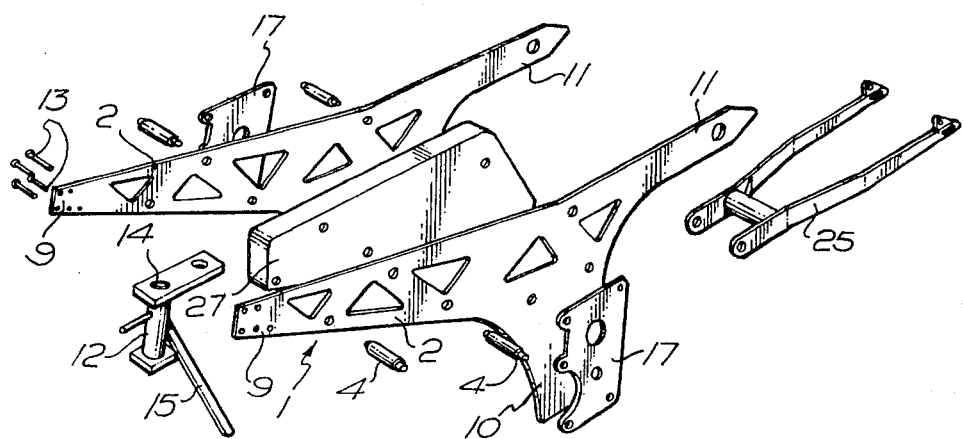
FIG. 1 is an exploded perspective view of a motorcycle frame according to the invention.

In the drawing, a frame 1 for a motorcycle is formed by two plate-like members 2 removably secured together in spaced relationship by spacers or distance pieces 3. The plate-like members 2 are relatively wide, that is, have a width that is much larger than the thickness thereof.

Spacers 3 as shown by FIG. 5 are formed by sleeve-like members 4 having internally screw-threaded portions 5 to receive respectively the externally threaded portions 6 of bolts 7 each terminating in a head 8. Thus, with the sleeve 4 lying between the plates 2, and portions 6 passing through appropriate holes in the plates, the plates are clamped between the bolt head 8 and the ends of the sleeve 4. By providing a number of sleeves 4 and bolts 7, the plates 2 are rigidly held together and correctly spaced from each other to provide a motorcycle frame, and yet can readily be dismantled should the need arise.

To provide for the mounting on the frame 1 of the major components of the motorcycle, the plates 2 are each so shaped as to provide a forward extension or end portion 9, a downward extension 10 and a rearward extension 11. Between forward extension 9, a front fork support member 12 is secured by bolts 13 passing through the plates 2, the support member 12 being so oriented that the axis of the hole 14 through it (and through which the pivot stem of a front fork, not shown, passes) sets the angle of inclination of the front fork. Because of the need to alter the fork angle in certain circumstances (as has been discussed previously) it is a relatively simple matter to remove the bolts 13 and the support member 12, and to replace it by another support member the hole 14 of which has an axis of a different angle thereby to provide an alternative fork angle known to be more suited to the particular purpose for which the cycle is to be used and the prevailing ground conditions. In the alternative, the support member 12 may be adjustably mounted between the plates and then the front fork angle can be adjusted as may be required.

Figure 2:
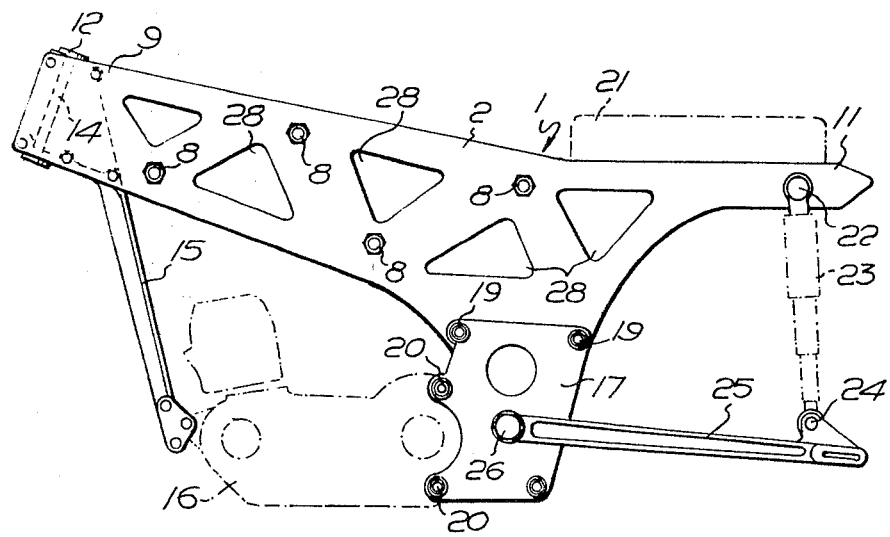
FIG. 2 is a side elevation of the frame of FIG. 1.

To ensure maximum strength, the front end portions 9 have a width large enough to embrace front fork support member 12 over substantially the entire length of said support member (see FIG. 2). This is important to prevent distortion of the frame 2 upon loading of the front fork.

As shown, the support member 12 is integral with a strut 15 extending downwardly and which strut assists in securing an engine 16 in place. It will however be recognized that the strut 15 may be suitably secured by its upper end between forward extensions 9 of the plates 2.

The downward extensions 10 of the plates 2, being also plate-like and relatively wide, may themselves serve to secure the engine 16 in place, but, as shown, it is preferred to provide two auxiliary plates 17. The plates 17 preferably have a configuration corresponding to the configuration of the plate-like downward extension 10, with the lower regions of the plates 17 being approximately co-extensive with extensions 10. The plates 17 are wide enough to prevent distortion of the plates 2 under loading by the engine. Each plate 17 is secured externally of and in spaced relationship to the respective plate 2. Thus, two sleeves 8 are provided between the downward extensions 10, and further corresponding sleeves 18 between the plates 2 and the respective auxiliary plate 17, bolts 19 passing through holes in the auxiliary plates, the sleeves 18, the plates 2 and into the sleeves 8 to secure the plates 2 and the auxiliary plates 17 together. By providing the auxiliary plates 17 of an appropriate shape to suit a particular engine, the engine can readily be removably secured between the plates 17 by bolts 20 passing through holes in the plates 17 and into the engine mounting block. When an engine needs to be removed (for repair or replacement) disconnection of the engine is very easily effected, and when an engine needs to be replaced by a different make or size of engine more suited to the purpose for which the motorcycle is to be used or more suited to prevailing ground conditions, the auxiliary plates can simply be removed by removing the bolts 19 and replaced by other auxiliary plates of an appropriate shape to suit the replacement engine.

The rearward extensions 11 of the plates 2 are also relatively wide but may be narrower than extensions 9 and 10. The rearward extensions 11 serve the two-fold purpose of providing support for a seat 21 and for locating, at a convenient point by pivots 22, spring or hydraulic damping members 23, the damping members 23 each extending and being pivotally secured at 24 to one of a pair of rear fork members 25. The rear fork members 25 are themselves pivotally secured at 26 to respective auxiliary plates 17. As aforementioned, plate members 2 are each substantially flat as shown in FIG. 1. However, to ensure sufficient clearance between the damping members and a wheel secured in the rear fork, the rearward extensions 11 of the plates 2 may be splayed outwardly (see FIG. 4) such that at their ends, the width between the rearward extensions corresponds to the width between the rear fork members 25.

A petrol tank 27 (indicated in FIG. 1) is to be sited between the plates 2, with passageways through the tank being provided for the sleeves 4. In this case, a metal or moulded plastics cover can be provided to enhance rider comfort and appearance. Alternatively, a petrol tank 27a of conventional construction may be provided with a recess 30 in its lower face into which the frame members fit (see FIG. 2).

The space between the plates 2 may also be utilized to house other necessary items such as a battery, fuse box, ignition system and electrical wiring with other items such as the mudguards and lights being suitably secured to the front and rear extensions 9 and 11 of the plates 2.

The plates 2 and auxiliary plates 17 may be formed from any suitable material advantageously combining the two features of high strength and low weight. Thus, a suitable aluminum alloy is preferred although other materials such as a suitable synthetic plastics material may be employed. To further lighten the construction, holes 28 may be formed in the plates 2 during stamping or cutting of the plates.

In this disclosure, there is shown and described only the preferred embodiments of the invention, but as aforementioned, it is to be understood that the invention is capable of other and different embodiments in various other combinations and environments, and is capable of changes or modifications within the scope of the inventive concept as expressed herein.

What is claimed is:

1. A frame for a motorcycle, comprising:
   two substantially wide main frame members, each being formed of a plate member that is substantially flat in cross section along its entire expanse and has a forwardly projecting portion, a downwardly projecting portion and a rearwardly projecting portion;
   first spacer means for releasably securing said frame members together in constant parallel relationship at least over the forwardly projecting portions and downwardly projection portions;
   the rearwardly projecting portions of said main frame members being adapted for releasably securing thereto a rear wheel assembly; and
   auxiliary plate members releasably secured to the downwardly extending portions of said main frame members for attachment to the engine, said auxiliary plate members being substantially wide and substantially coextensive with said downwardly extending portions to prevent distortion of the main plate members under loading by the engine.

2. The motorcycle frame as in claim 1, wherein said auxiliary plate members are located at outer surfaces of said downwardly projecting portions of said main frame members, and including second spacer means for positioning the auxiliary plate members at any desired spacing greater than the spacing of the main plate members while keeping the main plate members at a constant spacing, whereby any one of several different engines having different widths can be secured to the frame.

3. A frame for a motorcycle comprising:
   two substantially wide main frame members, each being formed of a main plate member that is substantially flat in cross section along its entire expanse and has a forwardly projecting portion, a downwardly projecting portion and a rearwardly projecting portion;
   means for releasably securing together said main frame members in constant parallel relationship at least over the forwardly and downwardly extending portions, said main frame members being open and separated at forward ends of said forwardly extending portions; and
   a front fork support member positioned between said main frame members and in contact with inner surfaces of said main frame members near the forward ends of said forwardly projecting portions;
   said releasably securing means including a plurality of equal length spacer members, each including a sleeve disposed between said main plate members, the forward ends of said forwardly projecting portions of said frame members being maintained spaced apart by only said front fork support member;
   the downwardly projecting portions of said frame members being adapted for releasably securing thereon an engine;
   the rearwardly projecting portions of said main frame members being adapted for releasably securing thereto a rear wheel assembly.

4. The motorcycle frame as in claim 3, wherein said rearwardly extending portions are splayed outwardly to accommodate rear wheel assemblies of various sizes.

5. The motorcycle frame as in claim 3, wherein said main frame members are identical to each other and thereby adapted for use, alternatively, as a left hand or a right hand frame member.

6. The motorcycle frame of claim 4, wherein each of said forward ends of said forwardly extending portions has a width large enough to embrace substantially the entire length of said support member.

* * * * *